(12) United States Patent
Meilinger et al.

(10) Patent No.: US 10,217,442 B2
(45) Date of Patent: Feb. 26, 2019

(54) METHOD FOR THE COMMON REPRESENTATION OF SAFETY-CRITICAL AND NON-SAFETY-CRITICAL INFORMATION, AND DISPLAY DEVICE

(71) Applicant: Airbus Defence and Space GmbH, Taufkirchen (DE)

(72) Inventors: Juergen Meilinger, Wolnzach (DE); Ulrich Schneider, Sulzberg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 9 days.

(21) Appl. No.: 15/065,376

(22) Filed: Mar. 9, 2016

(65) Prior Publication Data
US 2016/0267885 A1 Sep. 15, 2016

(30) Foreign Application Priority Data

Mar. 10, 2015 (DE) .................. 10 2015 002 973

(51) Int. Cl.
*B60K 37/02* (2006.01)
*G09G 5/377* (2006.01)
(Continued)

(52) U.S. Cl.
CPC ............ *G09G 5/377* (2013.01); *B60K 35/00* (2013.01); *B60K 37/02* (2013.01); *G01C 23/00* (2013.01);
(Continued)

(58) Field of Classification Search
None
See application file for complete search history.

(56) References Cited

U.S. PATENT DOCUMENTS 5,900,873 A * 5/1999 Isoda ..................... G09G 5/14
715/794
6,054,994 A 4/2000 Becker et al.
(Continued)

FOREIGN PATENT DOCUMENTS

DE  4323082  1/1995
DE  19516090  11/1996
(Continued)

OTHER PUBLICATIONS

German Search Report, dated Mar. 10, 2015, priority document.
European Search Report, dated Jul. 1, 2016 priority document.
European Office Action, dated Jan. 15, 2018, priority document.

*Primary Examiner* — David H Chu
(74) *Attorney, Agent, or Firm* — Greer, Burns & Crain Ltd.

(57) ABSTRACT

A method for the common representation of safety-critical and non-safety-critical information on a display unit of a vehicle. The method includes receiving non-safety-critical information and producing at least one graphic presentation of the non-safety-critical information. The method also includes receiving safety-critical information and producing at least one graphic presentation of the safety-critical information. In addition, the method includes representing the presentations of safety-critical and non-safety-critical information on the display unit, the representation having at least two representation planes. The non-safety-critical information is represented on a rear, in the direction of view of the observer, plane of the at least two representation planes, and the safety-critical information is represented on a front representation plane. The method includes checking whether the safety-critical information is recognizable when there is an at least partial overlap of the presentation of the non-safety-critical information by the presentation of the safety-critical information.

10 Claims, 4 Drawing Sheets

(51) Int. Cl.
  *G08G 1/0962* (2006.01)
  *B60K 35/00* (2006.01)
  *G01C 23/00* (2006.01)
  *G09G 5/14* (2006.01)
  *G09G 5/36* (2006.01)

(52) U.S. Cl.
  CPC ............ *G08G 1/0962* (2013.01); *G09G 5/14* (2013.01); *G09G 5/363* (2013.01); *B60K 2350/1096* (2013.01); *G09G 2320/10* (2013.01); *G09G 2340/12* (2013.01); *G09G 2340/14* (2013.01); *G09G 2380/12* (2013.01)

(56) References Cited

U.S. PATENT DOCUMENTS

| | | | | |
|---|---|---|---|---|
| 6,121,899 | A * | 9/2000 | Theriault | G01C 23/00 340/946 |
| 7,382,237 | B2 | 6/2008 | Stoschek et al. | |
| 7,456,833 | B1 * | 11/2008 | Diard | G06T 1/20 345/440 |
| 7,627,518 | B1 * | 12/2009 | West | G06F 3/0481 705/37 |
| 7,965,202 | B1 * | 6/2011 | Chiew | G01C 23/00 340/973 |
| 8,742,952 | B1 * | 6/2014 | Bold | G08G 5/0078 340/435 |
| 9,205,743 | B2 | 12/2015 | Rahe et al. | |
| 9,384,609 | B2 * | 7/2016 | Ricci | B60Q 1/00 |
| 2004/0201608 | A1 * | 10/2004 | Ma | G06F 3/0481 715/719 |
| 2005/0143884 | A1 * | 6/2005 | Bihler | B60K 28/06 701/36 |
| 2006/0024089 | A1 * | 2/2006 | Yamada | G06K 15/02 399/194 |
| 2006/0255986 | A1 * | 11/2006 | Takanezawa | G08B 13/196 341/67 |
| 2007/0192733 | A1 * | 8/2007 | Horiuchi | G06F 3/0483 715/788 |
| 2010/0023264 | A1 * | 1/2010 | G | G08G 5/04 701/301 |
| 2012/0242505 | A1 | 9/2012 | Maeda et al. | |
| 2012/0263349 | A1 * | 10/2012 | Ikegami | G06F 11/327 382/103 |
| 2014/0225753 | A1 | 8/2014 | Conrardy et al. | |
| 2015/0088341 | A1 * | 3/2015 | De Rammelaere | B64C 19/00 701/3 |
| 2015/0279260 | A1 | 10/2015 | Katagiri | |
| 2016/0240012 | A1 * | 8/2016 | Gruenler | G06T 19/006 |
| 2017/0053453 | A1 * | 2/2017 | Andre | G01C 21/00 |

FOREIGN PATENT DOCUMENTS

| | | |
|---|---|---|
| DE | 10347300 | 5/2005 |
| DE | 102004028481 | 12/2005 |
| DE | 102005042695 | 8/2006 |
| DE | 102005029800 | 1/2007 |
| DE | 102007032257 | 1/2009 |
| WO | 2014061386 | 4/2014 |

* cited by examiner

METHOD FOR THE COMMON REPRESENTATION OF SAFETY-CRITICAL AND NON-SAFETY-CRITICAL INFORMATION, AND DISPLAY DEVICE

CROSS-REFERENCES TO RELATED APPLICATIONS

This application claims the benefit of the German patent application No. 10 2015 002 973.8 filed on Mar. 10, 2015, the entire disclosures of which are incorporated herein by way of reference.

BACKGROUND OF THE INVENTION

Various specific embodiments relate in general to a method for the common representation of safety-critical and non-safety-critical information on a display device.

Through the development of low-cost and large-surface display screens, e.g., LCD displays, LED displays, or OLED displays, the development in the cockpit area of vehicles, or aircraft and motor vehicles continues to move in the direction of representing large amounts of information concerning the vehicle and vehicle navigation on a common large-surface display. Here, safety-critical information and non-safety-critical information are shown together on a screen. However, in some circumstances it can happen that, due to the large amount of information, the information critical for the safe operation of the vehicle can be overlooked.

SUMMARY OF THE INVENTION

As a result, an object of the present invention is to indicate a method that improves the common representation of safety-critical and non-safety-critical information.

The object is achieved by a method for the common representation of safety-critical and non-safety-critical information on a display unit, the method including the receiving of non-safety-critical information and producing at least one graphic presentation of the non-safety-critical information. The method further includes the receiving of safety-critical information and production of at least one graphic presentation of the safety-critical information. The method further includes the representation of the presentations of safety-critical and non-safety-critical information on the display unit, the representation having at least two representation planes. In the method, the presentation of the non-safety-critical information is shown on a rear plane, in the direction of the view of the observer, of the at least two representation planes, and the presentation of the safety-critical information is shown on a front representation plane. In the method, it is checked whether, in the case of an at least partial overlap of the presentation of the non-safety-critical information by the presentation of the safety-critical information, the safety-critical information is recognizable.

The present invention is based on the idea that, given representation of safety-critical and non-safety-critical information on a common display unit (display), the non-safety-critical information is represented in the background, i.e., on a rear or lower plane of representation from the point of view of the observer. The safety-critical information is shown in the foreground, i.e., on a front or upper plane of representation from the point of view of the observer. Here, when there is an overlapping of safety-critical information on the front plane of representation, it is checked whether, in the case of an overlapping of this representation with the representation of the non-safety-critical information on the rear plane of representation, the safety-critical information continues to be well recognizable. This has the advantage that given the common representation of safety-critical information and non-safety-critical information, the safety-critical information can be recognized at all times.

Preferably, in the method, if during the check it has been determined that the presentation of the non-safety-critical information is overlapped by the presentation of the safety-critical information, at least the overlapping parts of the presentation of the safety-critical information are adapted in such a way that the safety-critical information is recognizable. This has the advantage that through the adaptation of at least the overlapping parts of the presentation of the safety-critical information, the recognizability of the safety-critical information is improved. In this way, it is ensured that the observer can recognize well the safety-critical information when there is a common representation of safety-critical and non-safety-critical information.

Preferably, in the method, at least parts of the presentation of the safety-critical information are so adapted by modifying the graphic presentation of the overlapping parts as such. Through a modification of the graphic presentation of the overlapping parts, the recognizability is improved, and it is ensured that the observer can recognize well the safety-critical information when there is a common representation of safety-critical and non-safety-critical information. This has the advantage that safety-critical information is clearly recognizable.

Preferably, in the method the modification of the graphic presentation takes place through a color modification, a line modification, a size modification, a contrast modification, and/or a modification of the representation frequency. In order to ensure that the safety-critical information continues to be recognizable when there is an overlap of parts of the presentation of the non-safety-critical information by the safety-critical information, for example the presentation can be modified, at least in the overlapping parts, through a color modification, a line modification, a size modification, a contrast modification, and/or a modification of the representation frequency. Preferably, a representation is chosen that is distinguished as well as possible from the overlapping representation of the information. For example, given an overlap of two lines having the same color and the same thickness, the line color and/or the line thickness of the presentation of the safety-critical information in the overlapping region is modified in such a way that the presentations can be distinguished as well as possible, and the presentation of the safety-critical information is reliably recognizable. For example, the line thickness of the safety-critical information is greatly increased. In this way, the line of the safety-critical information is strongly set apart from the line representation of the non-safety-critical information. Here it can happen that the presentation of the non-safety-critical information is covered at least partly by the presentation of the safety-critical information in such a way that the presentation of the non-safety-critical information cannot be recognized by the observer, at least at times. Through this method, however, it is ensured that the safety-critical information is always recognizable to the observer. This has the advantage that for the operation of a vehicle, permanent recognizability of the safety-critical information is provided.

Preferably, in the method the safety-critical information includes vehicle-critical information and the non-safety-critical information includes navigation-critical and/or mission-critical information. The safety-critical information is for example information that is critical for the safety of the operation of the vehicle, and is thus of essential importance.

In an airplane, for example, the information concerning the remaining quantity of fuel or, for example, the flight altitude is of essential importance. In contrast, information necessary for navigation or for a mission, for example waypoints, are only of secondary importance for the actual safety of the vehicle, and can be overlapped at least at times by the presentation of the safety-critical information.

Preferably, the method further includes the step that the safety-critical information and the non-safety-critical information are received together and are separated into safety-critical information and non-safety-critical information according to predetermined criteria. According to a specific embodiment, all information received and provided for example by sensors in the vehicle is categorized into safety-critical information and non-safety-critical information in accordance with predetermined criteria. The criteria here can for example be dynamically adapted, for example, as a function of the particular flight situation. Alternatively, the criteria can also be prespecified for particular flight situations, for example, before the beginning of the flight. This has the advantage that received information can be divided into safety-critical and non-safety-critical information in a manner adapted to the respective situation.

In addition, the object is achieved by a display device for the common representation of safety-critical and non-safety-critical information on a display unit (display) that includes at least one first receiver set up to receive non-safety-critical information; and at least one first processor, set up to produce at least one presentation of the non-safety-critical information. In addition, the display device has at least one second receiver that is set up to receive safety-critical information. The display device further has at least one second processor that is set up to produce at least one presentation of the safety-critical information. In addition, the display device has a representation unit that is set up for the common representation of the presentations of safety-critical and non-safety-critical information on the display unit, the representation having at least two representation planes. On the display device, the presentation of the non-safety-critical information is shown, in the direction of view of an observer, on a rear plane of the at least two representation planes, and the presentation of the safety-critical information is shown on a front representation plane. In the display device, the second processor is further set up to check whether the safety-critical information is recognizable when there is an at least partial overlap of the presentation of the non-safety-critical information by the presentation of the safety-critical information.

The production of a presentation having non-safety-critical information as background image and of a presentation having safety-critical information in the foreground ensures that the safety-critical information continues to be visible.

According to a specific embodiment, the first receiver can also be part of the first processor or can be integrated therein. In addition, according to a further specific embodiment the second receiver can also be part of the second processor or integrated therein. This has the advantage that a higher degree of integration can be achieved.

Preferably, the second processor is a DAL-A and/or DAL-B safety-certified processor. In air travel, for example, five safety levels, also called DAL (Design Assurance Level) levels DAL-A to DAL-E, are used. The different levels are defined via a guideline for the certification of avionics software. Here, DAL-A designates "catastrophic" effects on the aircraft in case of failure, and DAL-E designates "no effects" in such a case. Depending on the functions that a software or hardware unit is to fulfill, it can endanger the safety of the vehicle to a greater or lesser degree. Depending on the endangerment effects, different demands are placed on the development process. However, as DAL-A and/or DAL-B, only a limited number of processors are available. For example, the use of multicore processors for a DAL-A- or DAL-B-critical application is, as a rule, possible only to a very limited extent, or is impossible, because these processors often do not have, or have only to a very limited extent, the required safety, predictability, and determinism.

Preferably, the second processor is a graphics processor and/or video processor. The graphics processor and/or video processor is preferably set up, when at least parts of the presentation of the non-safety-critical information are overlapped by the presentation of the safety-critical information, to adapt at least the overlapping parts of the presentation of the safety-critical information in such a way that the safety-critical information is recognizable. For example, the second processor is an FPGA (Field Programmable Gate Array) processor. FPGA processors for DAL-A- or DAL-B-critical applications are available, but have a significantly lower computing power in comparison with current multicore processors. The first processor can, for example, be a multicore processor, because it processes only non-safety-critical information. As a rule, in comparison with the safety-critical information, the non-safety-critical information is more extensive and therefore also requires more computing power for its representation. The separation of the more computing-intensive part for the representation of the non-safety-critical information from the comparatively less computing-intensive representation of the safety-critical information makes it possible also to use large-format displays, it being ensured that the safety-critical information is processed by an authorized or authorizable processor.

Preferably, the second processor is set up to adapt parts of the presentation of the safety-critical information in such a way that the graphic presentation of the overlapping parts as such is modified.

Preferably, the second processor is set up to adapt the graphic presentation through a color modification, a line modification, a size modification, a contrast modification, and/or a modification of the representation frequency.

Preferably, the safety-critical information contains vehicle-critical information. The non-safety-critical information preferably contains navigation-critical and/or mission-critical information.

Preferably, the display device has at least one third processor that is set up to receive a plurality of different items of information from the vehicle, to categorize the received information into safety-critical information and non-safety-critical information in accordance with predetermined criteria, and, in accordance with the categorization, to forward it to the receivers for safety-critical information and non-safety-critical information.

In addition, the object is achieved by a vehicle that has a display device as described above. During operation of a vehicle, a large amount of data is determined that is displayed to the driver of the vehicle on a common display unit. Here, for the safety of the vehicle it is important that the vehicle safety-critical data are always recognizable. Non-safety-critical data, such as data used for the navigation of the vehicle, can be at least temporarily not visible to the driver, because this does not endanger the safety of the vehicle.

For the authorization of the display device for use in the processing of safety-critical information, as a rule it is required for the processor or processors that process safety-critical information to have a corresponding authorization.

For the processing of non-safety-critical information, for example a non-authorized processor can be used. Preferably, at least the second processor and/or the third processor are thus such authorized or authorizable processors.

Preferably, the vehicle is an aircraft. The display device is preferably situated in the cockpit of the aircraft. The above-described display device is for example capable of being used in an aircraft cockpit. Through the use of a single display unit, this unit can, in comparison to the use of a plurality of small displays, display a plurality of items of information concerning the state of the aircraft, the flight route, the flight mission, or the like. In particular in aircraft, it is of essential importance that the safety-critical information be presented and recognized at all times, because, for example, a technical problem with an engine has to be recognized immediately in order to make it possible to immediately introduce necessary countermeasures if warranted. If such safety-critical information is not recognizable by the pilot, even for a short time, in some circumstances this can cause larger problems than if the information is recognizable at all times and the pilot can immediately take the necessary measures.

BRIEF DESCRIPTION OF THE DRAWINGS

In the drawings, in general identical reference characters relate to the same parts throughout the various views, to the extent that this is useful. The drawings are not necessarily to scale; in general, the emphasis has rather been placed on the illustration of the principles of the present invention. In the following description, various specific embodiments of the present invention are described with reference to the following drawings.

DETAILED DESCRIPTION OF THE PREFERRED EMBODIMENTS

The following detailed description makes reference to the accompanying drawings which show, in explanatory fashion, specific details and specific embodiments in which the present invention can be practiced.

The word "exemplary" is used herein with the meaning "serving as an example, case, or illustration." Each specific embodiment or realization described herein as "exemplary" is not necessarily to be interpreted as preferred or advantageous in relation to other specific embodiments or realizations.

In the following detailed description, reference is made to the accompanying drawings, which form a part thereof and in which, for illustration, specific embodiments are shown in which the present invention can be practiced. In this regard, directional terminology, such as "above," "below," "at front," "at rear," "front," "rear," etc., are used with reference to the orientation of the described Figure(s). Because components of specific embodiments can be positioned in a number of different orientations, the directional terminology serves only for illustration and is in no way limiting. It will be understood that other specific embodiments can be used, and that structural or logical modifications can be made, without departing from the scope of protection of the present invention. It will be understood that the features of the various exemplary embodiments described herein can be combined with one another unless specifically otherwise indicated. The following detailed description is therefore not to be understood in a limiting sense, and the scope of protection of the present invention is defined by the accompanying claims.

In the context of this description, the terms "bonded," "connected," and "coupled" are used to describe both a direct and an indirect bonding, a direct or indirect connection, and a direct or indirect coupling.

In the method described here, the steps can be executed in almost any desired sequence without departing from the principles of the present invention, if a temporal or functional sequence is not explicitly stated. In addition, indicated steps can be executed simultaneously if an express formulation that they are to be executed separately is not presented in a claim.

Figure 1:
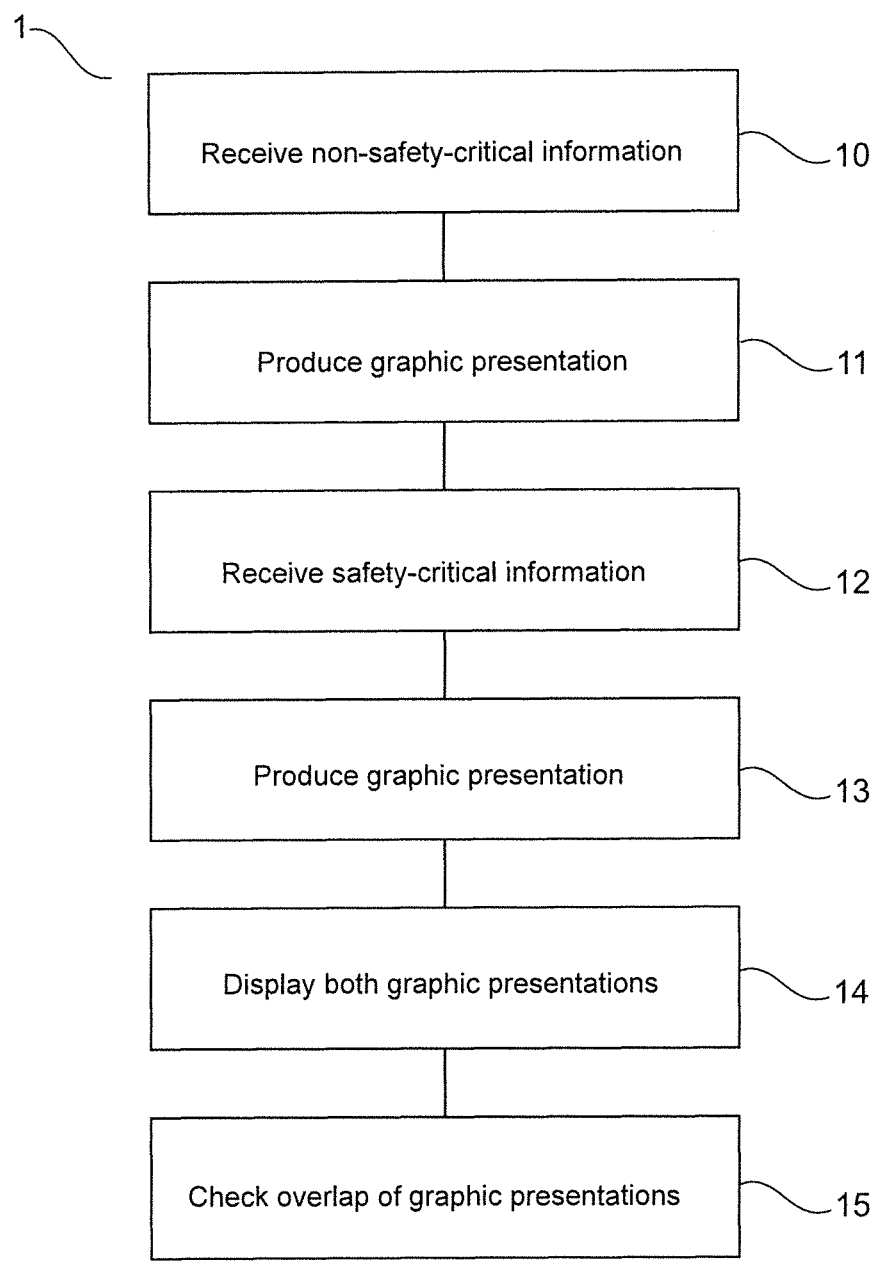
FIG. 1 shows a flow diagram for a specific embodiment of the method.

FIG. 1 shows a flow diagram 1 for a specific embodiment of the method for the common representation of safety-critical and non-safety-critical information on a display unit (display) of a vehicle. In step 10, non-safety-critical information is received. In step 11, at least one graphic presentation of the non-safety-critical information is produced. In step 12, safety-critical information is received. In step 13, at least one graphic presentation of the safety-critical information is produced. In step 14 the presentations of safety-critical and non-safety-critical information are shown on the display unit, the representation having at least two representation planes. The presentation of the non-safety-critical information is shown on a rear (in the direction of view of the observer) plane of the at least two representation planes, and the presentation of the safety-critical information is shown on a front representation plane. In step 15 it is checked to determine whether the safety-critical information is recognizable when there is an at least partial overlap of the presentation of the non-safety-critical information by the presentation of the safety-critical information.

Figure 2:
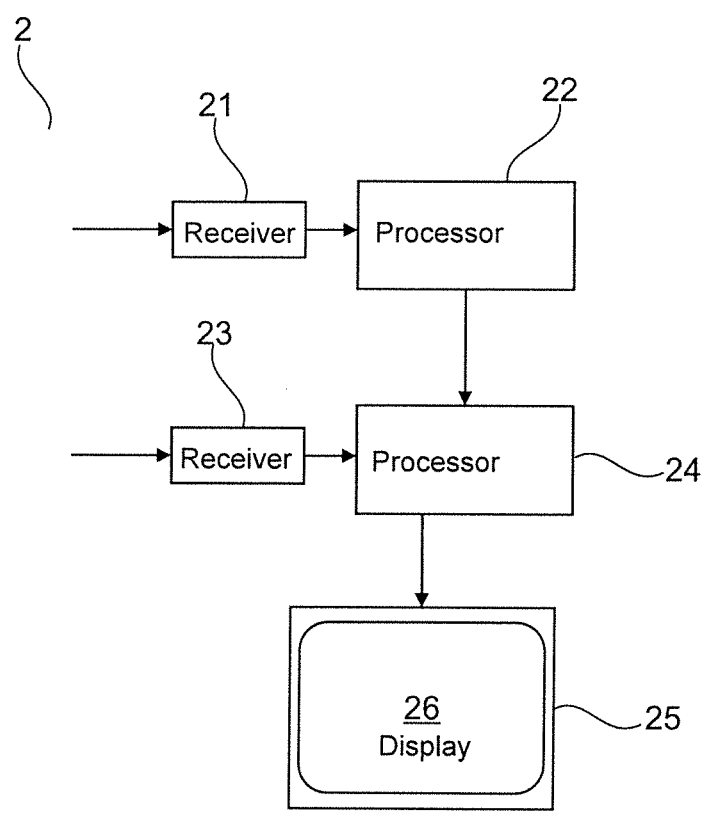
FIG. 2 shows the design of a specific embodiment of the device.

FIG. 2 shows the design of a specific embodiment of a device 2 for the common representation of safety-critical and non-safety-critical information on a display unit 26. The device has at least one first receiver 21. The first receiver 21 is set up to receive non-safety-critical information. The device 2 further has at least one first processor 22. The first processor 22 is set up to produce at least one presentation of the non-safety-critical information. The device 2 has at least one second receiver 23. The receiver 23 is set up to receive safety-critical information. The device further has at least one second processor 24. The second processor 24 is set up to produce at least one presentation of the safety-critical information. The device has a representation unit 25 that is set up for the common representation of the presentations of safety-critical and non-safety-critical information on a display unit (display) 26. The representation has at least two representation planes. The presentation of the non-safety-critical information is here represented on a rear plane of the at least two representation planes, in the direction of view of an observer. The presentation of the safety-critical information is represented on a front representation plane. The second processor 24 is further set up to check whether the safety-critical information is recognizable given an at least partial overlap of the presentation of the non-safety-critical information by the presentation of the safety-critical information.

Figure 3:
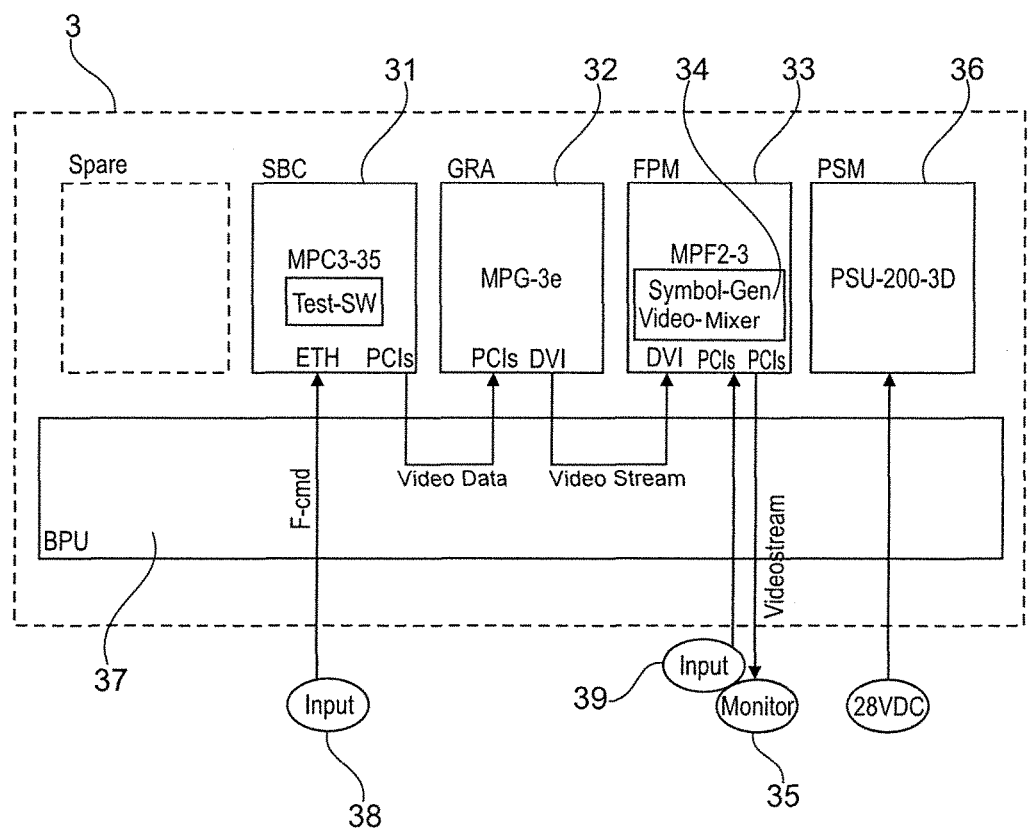
FIG. 3 shows the design of a further specific embodiment of the device.

FIG. 3 shows the design of a further specific embodiment of a device 3 for the common representation of safety-critical and non-safety-critical information on a display unit 35. The device 3 has a first computing unit 31, for example a single-board computer (SBC), which receives non-safety-critical information 38 and, from the received information, produces a graphic presentation of the information as image data and/or video data. The image and/or video data are forwarded to a graphics unit 32 that produces, from the image and/or video data, an image and/or video data stream, or video image, which is passed to an image/video mixer 34. The mixer 34 is, for example, a component of an FPGA module 33. The FPGA module 33 receives safety-critical information 39 and checks it, for example, for the observance of deadlines, completeness, or the like. The mixer 34 receives, from the graphics unit 32, the video image having the presentation of non-safety-critical information 38. The received video image is, for example, checked as to whether the receiving takes place within a pre specified time, whether the video image is complete, whether the orientation of the image is correct, or the like. The FPGA module 33 produces, from received safety-critical information 39, a presentation as video image. The mixer 34 provides an overlap mechanism. The overlap mechanism includes, for example, the checking of the region in which safety-critical information 39 is to be represented for contrast and/or brightness values or the like. In addition, the mixer 34 provides, for example, a contrast-rich and/or brightness-relevant mode as text and/or graphics, for example, for flight altitude and/or an artificial horizon. The mixer 34 creates an overall image from the rear plane having the presentation of the non-safety-critical information 38 and the front plane having the presentation of the safety-critical information 39. The mixer 34 further checks the overall image in the representation of the safety-critical information, for example, the flight-critical information, for images that appear. More precisely, the legibility or recognizability of the presentation of the safety-critical information is ensured through image monitoring, i.e., of each individual image of the image stream that is to be displayed.

In addition, for example, given the use of a panorama display 35 as the display device, it is checked which part of the panorama display 35 is currently active. For safety reasons, a panorama display 35, for example in the aircraft, must be made up of at least two parts. Should a part of the overall display fail, the representation of the overall image, with corresponding scaling, takes place on the remaining functioning part of the overall display. The mixer 34 scales the produced overall image to all active regions of the panorama display 35, checks the scaling, and outputs the overall image to the panorama display 35. In the depicted specific embodiment, in addition, the display device 3 has a (emergency) power supply 36. In the depicted specific embodiment, the data stream between the components of the display device 3 takes place via a common data bus 37.

Figure 4:
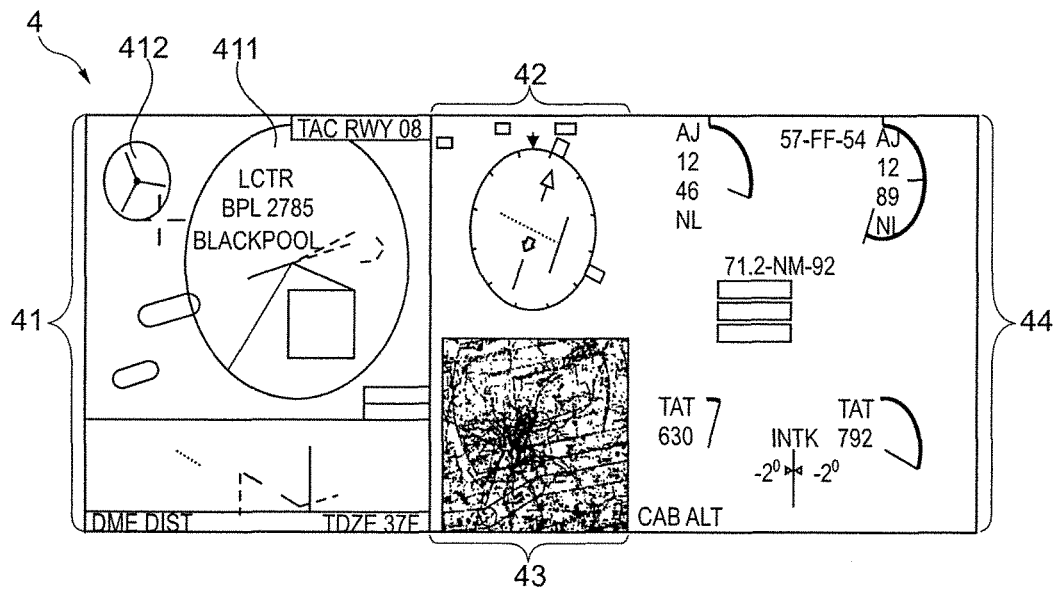
FIG. 4 shows a specific embodiment of the common representation of information.

FIG. 4 shows a specific embodiment of the common representation of safety-critical and non-safety-critical information on a common display unit (display) 4. Here, a first display region 41 of the display 4 shows mission data, for example, as non-safety-critical information 411. In addition to the non-safety-critical information 411, for example, further safety-critical information 412 are also shown. In order to ensure at all times the recognizability of the safety-critical information 412, the presentation of the non-safety-critical information 411 is shown on a rear (in the direction of view of the observer) plane of the at least two representation planes, and the presentation of the safety-critical information 412 is shown on a front representation plane. The second region 42 of the display shows for example navigation data, such as a compass, as non-safety-critical information. A third region 43 of the display shows, for example, a map as non-safety-critical information. A fourth display region 44 shows, for example, various information concerning the state of the aircraft engines as safety-critical information.

Figure 5:
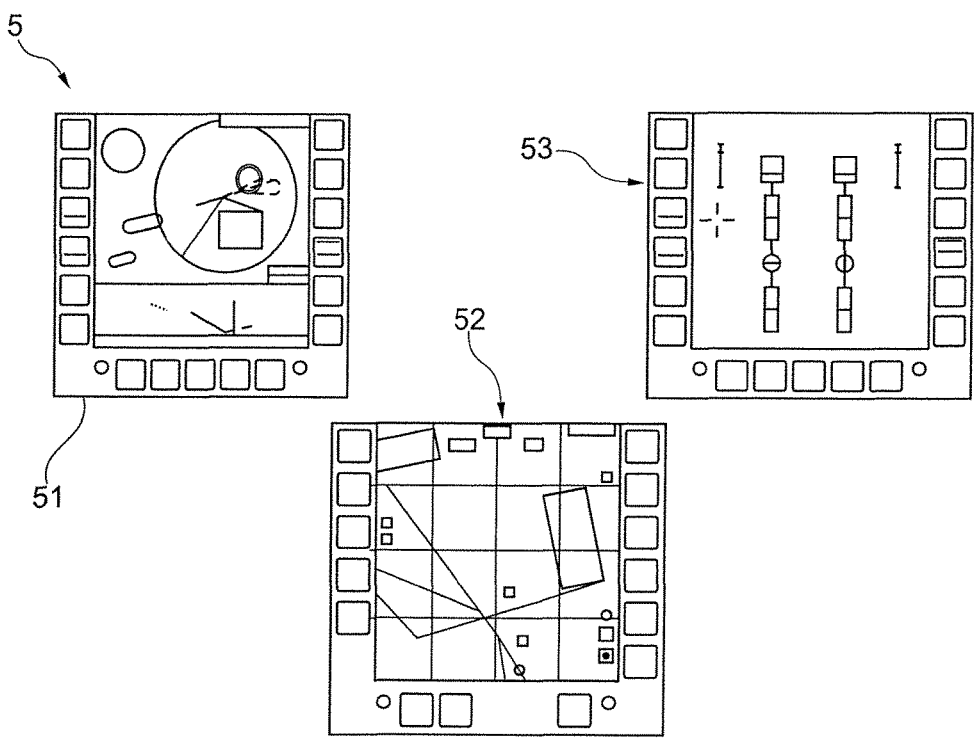
FIG. 5 shows a separate display device for safety-critical and non-safety-critical information.

FIG. 5 shows a separate display device 5 for safety-critical and non-safety-critical information. Such a display device 5 can be found, in the depicted configuration or in some other configuration, for example, in many cockpits of modern aircraft. Here, for example, a first display 51 shows the non-safety-critical information such as mission data. A second display 52 also shows the non-safety-critical information, such as navigation data and a map. In contrast, a third display 53 shows safety-critical information, such as various information concerning the state of the engines of the aircraft.

Although the present invention has primarily been shown and described with reference to particular specific embodiments, it will be understood by those familiar with this technical area that many modifications may be made with regard to design and details without departing from the essence and area of the present invention as defined by the accompanying claims. The area of the present invention is thus determined by the accompanying claims, and it is therefore intended that all modifications falling under the wording or range of equivalence of the claims be comprised.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 flow diagram
2 device
21 first receiver
22 first processor
23 second receiver
24 second processor
25 representation unit
26 display unit
3 device
31 first computing unit
32 graphics unit
33 second computing unit
34 mixer
35 monitor
36 power supply
37 data bus
38 non-safety-critical data
39 safety-critical data
4 display device 41 first display region
42 second display region
43 third display region
44 fourth display region
5 display device
51 first display
52 second display
53 third display

The invention claimed is:

1. A method for the common representation of safety-critical and non-safety-critical information on a display unit of a vehicle, comprising:

receiving non-safety-critical information by a first processor and producing at least one graphic presentation of the non-safety-critical information;

receiving safety-critical information by a second processor, wherein the second processor also receives the at least one graphic presentation of the non-safety-critical information;

producing at least one graphic presentation of the safety-critical information;

representing the presentations of safety-critical and non-safety-critical information on the display unit, the representation having at least two representation planes;

presenting the non-safety-critical information on a rear, in a direction of view of the observer, plane of the at least two representation planes, and presenting the safety-critical information on a front representation plane; and checking whether the safety-critical information is recognizable, in a case of an at least partial overlap of the presentation of the non-safety-critical information by the presentation of the safety-critical information;

wherein if during the checking step a determination is made that the presentation of the non-safety-critical information is overlapped by the presentation of the safety-critical information, adapting at least the overlapping parts of the presentation of the safety-critical information in such a way that the safety-critical information is recognizable;

adapting parts of the presentation of the safety-critical information by modifying the graphic presentation of the safety-critical information in the overlapping region such that the graphic presentation of the overlapping parts, as such, is modified;

wherein the modification of the graphic presentation of the safety-critical information in the overlapping region takes place through at least one of a color modification, a line modification, a size modification, a contrast modification, or a modification of the representation frequency.

2. The method as recited in claim 1, wherein at least parts of the presentation of the safety-critical information are so adapted that the graphic presentation of the overlapping parts, as such, is modified.

3. The method as recited in claim 1, wherein the safety-critical information contains vehicle-critical information, and the non-safety-critical information contains at least one of navigation-critical or mission-critical information.

4. The method as recited in claim 1, wherein the method further has the step that the safety-critical information and the non-safety-critical information are received together and are separated into the safety-critical information and the non-safety-critical information in accordance with predetermined criteria.

5. A display device for the common representation of safety-critical and non-safety-critical information on a display unit, comprising:

at least one first receiver set up to receive non-safety-critical information;

at least one first processor set up to produce at least one presentation of the non-safety-critical information;

at least one second receiver, set up to receive safety-critical information;

at least one second processor set up to produce at least one presentation of the safety-critical information, the at least one second processor configured to receive the at least one presentation of the non-safety-critical information;

a representation unit, set up for the common representation of the presentations of safety-critical and non-safety-critical information on the display unit, the representation having at least two representation planes;

the presentation of the non-safety-critical information being represented on a rear, in the direction of view of an observer, plane of the at least two representation planes, and the presentation of the safety-critical information being represented on a front representation plane; and the second processor being set up to check whether the safety-critical information is recognizable given an at least partial overlap of the presentation of the non-safety-critical information by the presentation of the safety-critical information;

the second processor being one of a graphics processor or video processor that is set up to adapt, if at least parts of the presentation of the non-safety-critical information are overlapped by the presentation of the safety-critical information, at least the overlapping parts of the presentation of the safety-critical information in such a way that the safety-critical information is recognizable;

wherein the second processor is set up to adapt parts of the presentation of the safety-critical information by modifying the graphic presentation of the safety-critical information in the overlapping region such that the graphic presentation of the overlapping parts, as such, is modified;

wherein the second processor is set up to adapt the graphic presentation of the safety-critical information through at least one of a color modification, a line modification, a size modification, a contrast modification, or a modification of the representation frequency.

6. The display device as recited in claim 5, wherein the second processor comprises one of a DAL-A or DAL-B safety-certified processor.

7. The display device as recited in claim 5, wherein the safety-critical information contains vehicle-critical information, and the non-safety-critical information contains at least one of navigation-critical or mission-critical information.

8. The display device as recited in claim 5, further comprising at least one third processor set up to receive a plurality of different items of information from the vehicle, to categorize the received information into the safety-critical information and the non-safety-critical information in accordance with predetermined criteria, and to forward the received information to the receivers for safety-critical information and non-safety-critical information in accordance with the categorization.

9. A vehicle, having a display device for the common representation of safety-critical and non-safety-critical information on a display unit, comprising:

at least one first receiver set up to receive non-safety-critical information;

at least one first processor set up to produce at least one presentation of the non-safety-critical information;

at least one second receiver, set up to receive safety-critical information;

at least one second processor set up to produce at least one presentation of the safety-critical information, the at least one second processor configured to receive the at least one presentation of the non-safety-critical information;

the second processor comprising one of a DAL-A or DAL-B safety-certified processor;

a representation unit, set up for the common representation of the presentations of safety-critical and non-safety-critical information on the display unit, the representation having at least two representation planes;

the presentation of the non-safety-critical information being represented on a rear, in the direction of view of an observer, plane of the at least two representation planes, and the presentation of the safety-critical information being represented on a front representation plane; and the second processor being set up to check whether the safety-critical information is recognizable given an at least partial overlap of the presentation of the non-safety-critical information by the presentation of the safety-critical information;

the second processor being one of a graphics processor or video processor that is set up to adapt, if at least parts of the presentation of the non-safety-critical information are overlapped by the presentation of the safety-critical information, at least the overlapping parts of the presentation of the safety-critical information in such a way that the safety-critical information is recognizable;

wherein the second processor is set up to adapt parts of the presentation of the safety-critical information by modifying the graphic presentation of the safety-critical information in the overlapping region such that the graphic presentation of the overlapping parts, as such, is modified;

wherein the second processor is set up to adapt the graphic presentation of the safety-critical information through at least one of a color modification, a line modification, a size modification, a contrast modification, or a modification of the representation frequency.

10. The vehicle as recited in claim 9, wherein the vehicle comprises an aircraft, and the display device is situated in a cockpit of the aircraft.

* * * * *